(12) United States Patent
Kerstens et al.

(10) Patent No.: US 12,386,067 B2
(45) Date of Patent: Aug. 12, 2025

(54) IN-AIR SONAR SYSTEM AND A METHOD THEREFOR

(71) Applicant: UNIVERSITEIT ANTWERPEN, Antwerp (BE)

(72) Inventors: Robin Kerstens, Mortsel (BE); Jan Steckel, Rupelmonde (BE)

(73) Assignee: UNIVERSITEIT ANTWERPEN, Antwerp (BE)

( * ) Notice: Subject to any disclaimer, the term of this patent is extended or adjusted under 35 U.S.C. 154(b) by 235 days.

(21) Appl. No.: 18/022,581

(22) PCT Filed: Aug. 6, 2021

(86) PCT No.: PCT/EP2021/072013
§ 371 (c)(1),
(2) Date: Feb. 22, 2023

(87) PCT Pub. No.: WO2022/043027
PCT Pub. Date: Mar. 3, 2022

(65) Prior Publication Data
US 2023/0314604 A1  Oct. 5, 2023

(30) Foreign Application Priority Data
Aug. 28, 2020 (EP) .................................... 20193350

(51) Int. Cl.
*G01S 15/58* (2006.01)
(52) U.S. Cl.
CPC .......... *G01S 15/582* (2013.01); *G01S 15/588* (2013.01)

(58) Field of Classification Search
CPC ........ G01S 15/582; G01S 15/588; G01S 7/54; G01S 15/42; G01S 15/52; G01S 15/931; G01S 7/52003
(Continued)

(56) References Cited

U.S. PATENT DOCUMENTS

| 6,987,707 B2 | 1/2006 | Feintuch et al. |
| 2016/0011310 A1 | 1/2016 | Horner et al. |

OTHER PUBLICATIONS

Kerstens et al., "An Optimized Planar MIMO Array Approach to In-Air Synthetic Aperture Sonar," IEEE Sensors Letters, vol. 3, No. 11, Nov. 1, 2019, pp. 1-4.
(Continued)

*Primary Examiner* — Daniel L Murphy
(74) *Attorney, Agent, or Firm* — Workman Nydegger

(57) ABSTRACT

An in-air sonar system is provided for determining location and velocity information of objects in an environment. The in-air sonar system includes at least two emitters configured to emit respective sound signals into the environment; at least two receivers configured to receive sound signals from the environment; and a processing unit configured to perform: obtaining, from the receivers, respective received sound signals comprising the emitted sound signal reflected from objects in the environment; calculating, from the respective received sound signals, respective velocity-dependent range maps; deriving, from the calculated velocity-dependent range maps and the spatial diversity of the receivers, a velocity-dependent range-direction map comprising range information as a function of a received direction; determining therefrom a location of the respective objects; and extracting, from the velocity-dependent range maps and the spatial diversity of the receivers, a velocity of the respective objects based on the determined location.

14 Claims, 8 Drawing Sheets

(58) Field of Classification Search
USPC .......................................................... 367/89
See application file for complete search history.

(56) References Cited

OTHER PUBLICATIONS

International Search Report from PCT Application No. PCT/EP2021/072013, Nov. 19, 2021.
Extended European Search Report from European application No. 20193350.4, Feb. 22, 2021.

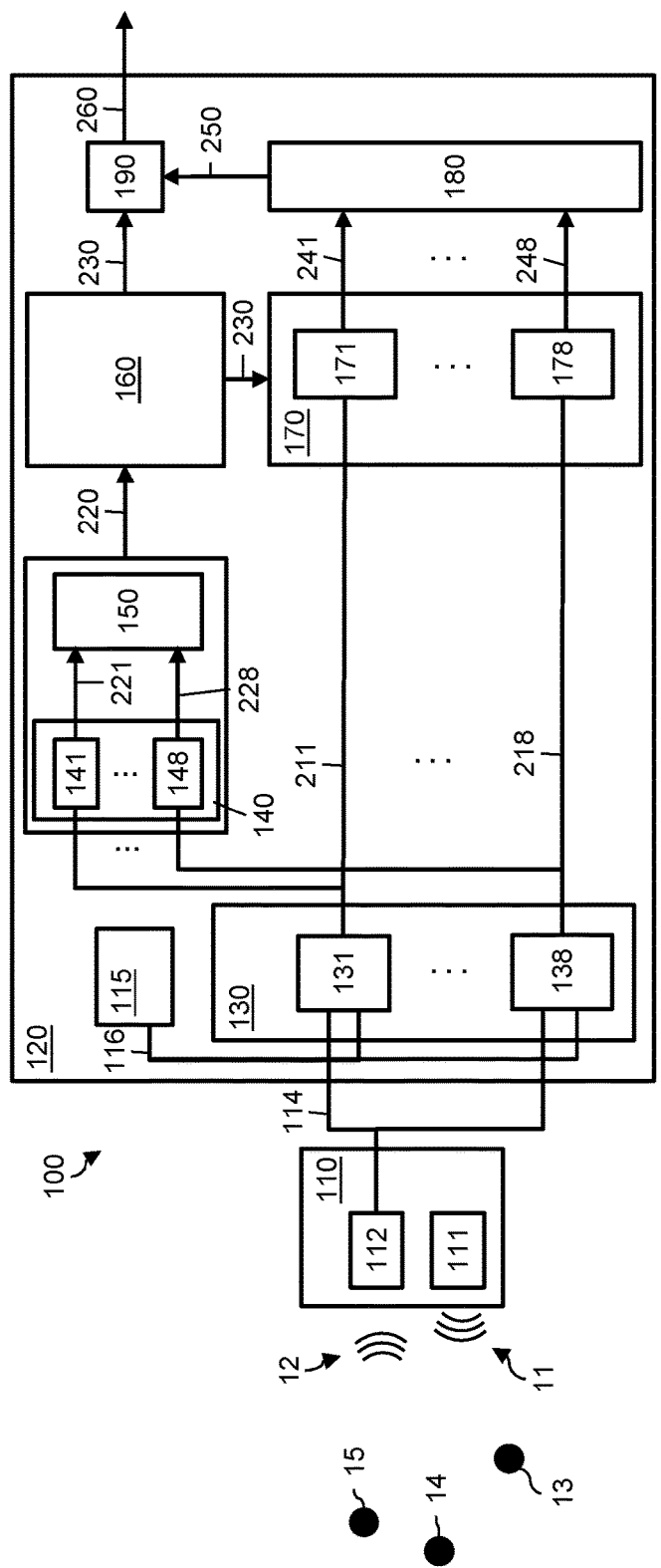
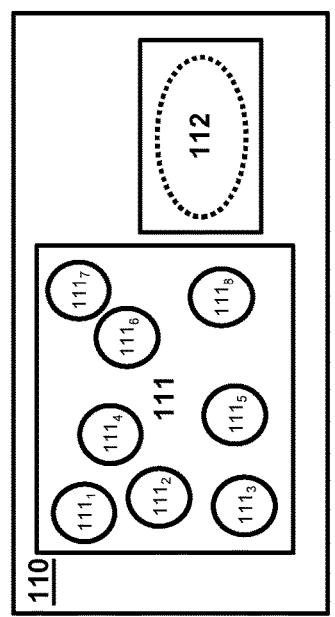
FIG.1A
FIG.1B

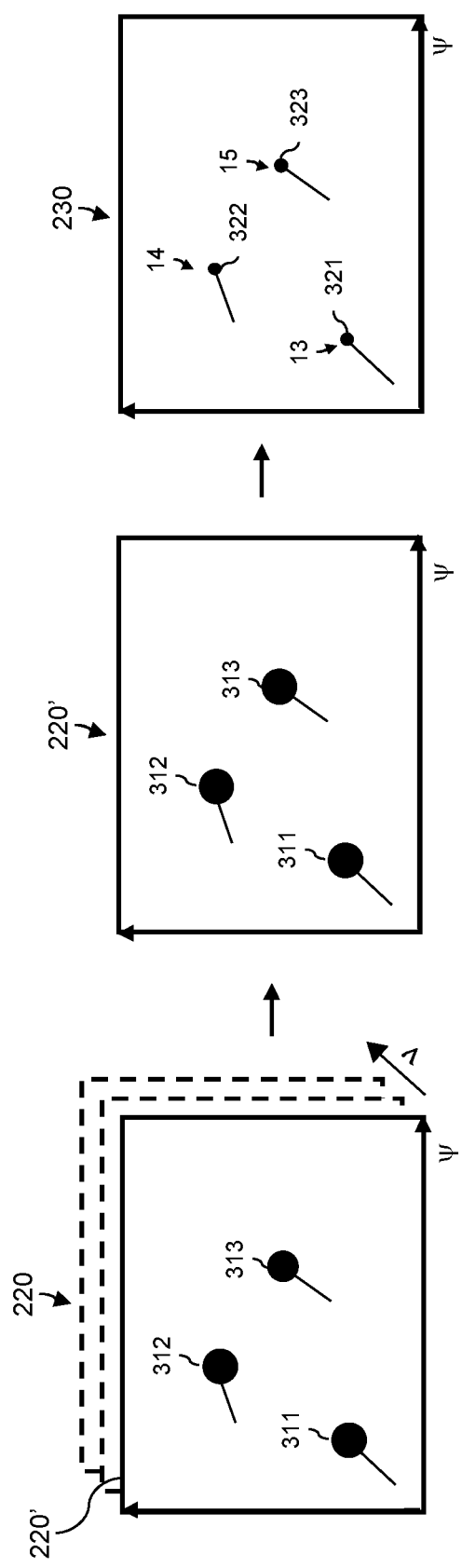
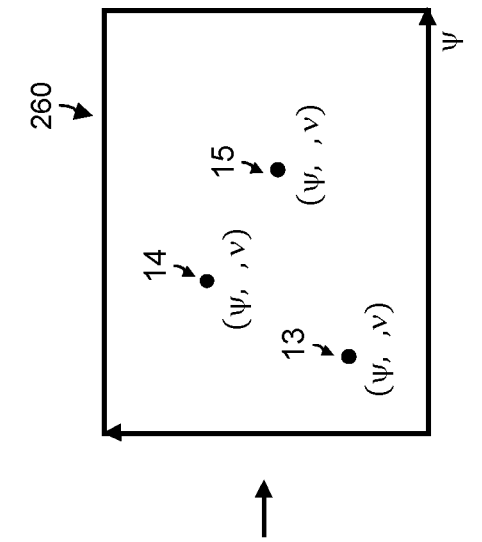
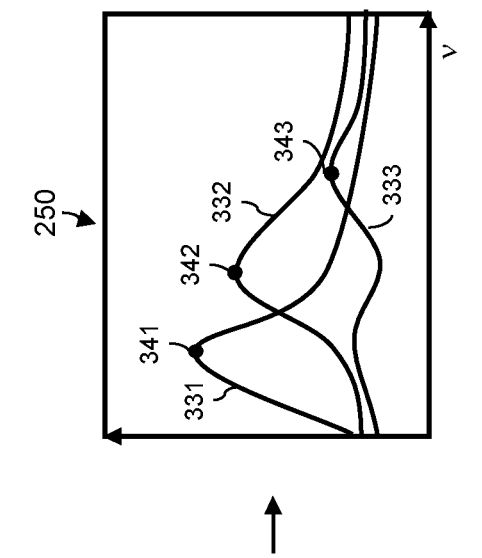
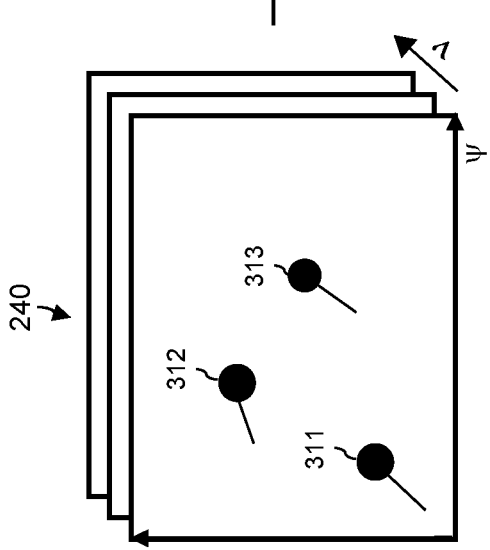
FIG.3B
FIG.3C

IN-AIR SONAR SYSTEM AND A METHOD THEREFOR

TECHNICAL FIELD

The present disclosure relates to an in-air sonar system for determining location and velocity information of objects in the environment and a method therefor.

BACKGROUND

In-air sonar is a sound-based ranging technique that uses sound propagation to detect objects in the environment, such as moving vehicles. In-air sonar enables the detection of objects and therefore their location in harsh and complex environments where other ranging technologies, such as lidars and 3D time-of-flight cameras, are failing. This makes the in-air sonar technology highly suitable for autonomous navigation of vehicles and robots where the measurement conditions are deteriorated by the presence of mud, dust, fog, water spray, and other hindrances.

Due to the speed of sound being slow in comparison to the speed of light, in-air sonar systems obtain the objects' location at a lower rate than other ranging technologies. This may cause an autonomous vehicle to make a bad decision in terms of navigation or path planning which drastically restricts the use of in-air sonar systems in practice.

U.S. Pat. No. 6,987,707 B2 discloses a system and a method for in-air ultrasonic acoustical detection and characterization for determining the location of persons and objects. The system allows detection of stationary and moving persons and other objects, through atmospheric conditions, to a distance of at least 300 feet. The system uses arrays of transmitters and receivers, where one or more transmitter arrays may be oriented substantially perpendicularly to one or more receiver arrays, allowing both high directionality and good rejection of reverberations, background noise, clutter and objects not of interest.

US 2016/0011310 A1 discloses a depth display using sonar data in which a marine electronic device which is configured to process sonar data obtained from a transducer array disposed on a vessel, to derive from the sonar data a point cloud data and to generate a depth display based on the point cloud data.

SUMMARY

An object of embodiments of the present disclosure is to provide an in-air sonar system overcoming the above limitations thereby enabling the use of an in-air sonar system in practice. Another object of embodiments of the present disclosure is to provide an in-air sonar system capable of determining the location and velocity of objects in the environment. A further object of embodiments of the present disclosure is to provide an in-air sonar system capable of discarding ghost objects.

The scope of protection sought for various embodiments of the invention is set out by the independent claims. The embodiments and features described in this specification that do not fall within the scope of the independent claims, if any, are to be interpreted as examples useful for understanding various embodiments of the invention.

These objects are achieved, according to a first example aspect of the present disclosure, by an in-air sonar system for determining location and velocity information of objects in an environment, the in-air sonar system comprising at least two emitters configured to emit respective sound signals into the environment, the respective sound signals having a low cross-correlation among each other; at least two receivers configured to receive sound signals from the environment; and a processing unit configured to perform:
  obtaining, from the receivers, respective received sound signals comprising the respective emitted sound signals reflected from objects in the environment;
  calculating, from the respective received sound signals, velocity-dependent range maps for the respective emitted sound signals; the velocity-dependent range maps comprising information about the range and velocity of the respective objects;
  deriving, from the calculated velocity-dependent range maps and the spatial diversity of the at least two emitters and the at least two receivers, a velocity-dependent range-direction map comprising range information as a function of a received direction;
  determining therefrom a location of the respective objects; and
  extracting, from the velocity-dependent range maps and the spatial diversity of the at least two receivers, a velocity of the respective objects based on the determined location.

In contrast to the conventional in-air sonar system, herein the Doppler effect in the presence of multiple receivers is exploited to determine both location and velocity information of the objects in the environment. Knowing the velocity of the objects in the environment enables the discrimination between stationary and moving objects and, moreover, between fast-moving and slow-moving objects. This allows distinguishing objects accurately which otherwise would be detected as one object. As a result, a more accurate representation of the environment is obtained, thereby enabling more sensible decisions in terms of navigation, path planning, and collision avoidance.

To achieve this, the environment is sensed by an in-air sonar system comprising at least two emitters and at least two receivers. The emitters respectively emit sound signals with a low cross-correlation among each other into the environment. These sound signals may be any sound signals exhibiting a low cross-correlation among each other. Such sound signals are the Pseudo-Random Additive White Gaussian Noise, PR-AWGN, signals. Further, these sound signals may have a frequency in the frequency range of 20 kHz to 100 kHz and may be emitted for a period of 10 msec. The duration of the emission depends on how fast or slow the objects within the environment are moving. For example, for an environment with faster moving objects the duration of emission may be in the range of 1 msec to 10 msec, while for slower moving objects it may be higher than 10 msec. The emitters are thus devices capable of emitting such signals. The emitted sound signals travel through the environment and get reflected from one or more objects therein. As a result, reflected sound signals are received by the receivers. More specifically, the sound signals received by a respective receiver comprise the respective emitted sound signals reflected from the objects in the environment. The receivers are thus devices capable of recording such sound signals. The processing unit processes the received sound signals to extract the location and velocity of the objects in the environment. Velocity-dependent range maps, i.e., one two-dimensional map for a respective receiver, are calculated comprising information about the range and velocity of the respective reflecting objects. From the velocity-dependent range maps, a velocity-dependent range-direction map is derived by taking into account the spatial diversity of the emitters and the receivers, i.e., by taking into account the different distances between the emitters and the respective reflecting objects and by taking into account the different distances between the receivers and the respective reflecting objects. The location of the of the respective objects is then determined from the thus derived velocity-dependent range-direction map which comprises range information as a function of a received direction. Finally, the velocity of the respective objects is extracted from the velocity-dependent range-direction maps obtained from the velocity-dependent range maps and the spatial diversity of the receivers. In other words, in this step the velocity-dependent range-direction maps are derived from the velocity-dependent range maps by taking into account the spatial diversity of the receivers only. A plurality of velocity-dependent range-direction maps, one map for a respective emitter, i.e., for a respective emitted sound signal, is obtained. From the obtained velocity-dependent range-direction maps, a velocity for the respective objects is obtained by taking into account their determined locations.

By constructing the velocity-dependent range-direction map in the manner detailed in the step of deriving, high-resolution location information of the sensed environment is obtained. This allows determining the location of the respective objects more accurately, and moreover, it allows discriminating between closely positioned objects in the sensed environment. By extracting the velocity of the respective objects based on their respective location, the accuracy of the velocity estimate is further improved which allows discriminating between slow and fast-moving objects.

Further, by emitting multiple sound signals, more energy is effectively emitted into the environment. The amount of energy reflected back by the reflecting objects to the in-air sonar system is increased, thereby allowing the detection of smaller objects. By emitting more energy, the detection range of the in-air sonar system is also improved. This allows detecting objects located further away from the in-air sonar system. Furthermore, by having the emitters emitting respective sound signals with low cross-correlation among each other, the in-air sonar system can perform ranging using the different sound signals which may be processed individually. Processing the sound signals separately allows improving both the Signal-to-Noise Ratio, SNR, and the Point Spread Function, PSF, of the in-air sonar system and hence its overall performance. This further improves the resolution of the obtained location and velocity information and therefore the overall reliability of the in-air sonar system.

According to example embodiments, the calculating comprises correlating the respective received sound signals with Doppler-shifted versions of the emitted sound signals.

In other words, the sound signals received from the respective receivers are correlated with Doppler-shifted versions of the respective emitted sound signal. The Doppler-shifted version is a conjugated time-reversed version of the emitted sound signal. By doing so, velocity-dependent range maps are obtained comprising range and velocity information.

According to example embodiments, the deriving comprises beamform processing the velocity-dependent range maps to compensate for delay variations between the emitted sound signals and between the received sound signals, thereby obtaining the velocity-dependent range-direction map.

In other words, by beamform processing the velocity-dependent range maps to compensate for the delay variations between the emitted sound signals and between the received sound signals a velocity-dependent range-direction map comprising information about the velocity, range and direction is obtained.

According to a further embodiment, the velocity-dependent range-direction map may be derived by first obtaining, from the velocity-dependent range maps, a range map for a selected Doppler shift, and then beamform processing the obtained velocity-specific range maps. At least two range maps comprising range information of the reflecting objects, one for each receiver, are thus obtained. The range maps are then beamform processed to obtain a range-direction map comprising range information as a function of the receiver direction for the selected Doppler shift. Any Doppler shift may be used for the selection. As a result, a less complex and therefore less time consuming beamform processing is employed.

According to example embodiments, the determining comprises clustering the velocity-dependent range-direction map by means of a clustering algorithm, thereby obtaining the location of the respective objects.

In contrast to the conventional approaches, where the location of the reflecting objects is extracted by means of thresholding or detecting local maxima, herein the location of the respective objects is obtained by means of a clustering algorithm. The clustering algorithm clusters or groups the data points in the velocity-dependent range-direction map in accordance with a set of clustering or grouping rules. As a result, a centre point of a cluster is obtained as a location of a reflecting object, thereby allowing a more accurate location estimation. Optionally, thresholding may be applied to the range-direction map prior to the clustering. The latter allows to remove the noise in the range-direction map and therefore speeds up the clustering.

According to example embodiments, the clustering algorithm is an Agglomerative Hierarchical Clustering, AHC algorithm.

An AHC algorithm is based on forming data clusters by repeatedly combining closely positioned data points, i.e., data points with similar range and direction values. The clustering is repeated until a stop condition is met, for example, until every data cluster contains a single data point. Examples of AHC algorithms include Single-Link hierarchical clustering, SLINK, also commonly referred to as nearest-neighbour, Paired Group Methods, PGM, and the Unweighted Centroid Clustering, UCC.

According to example embodiments, the extracting comprises:
  beamform processing the velocity-dependent range maps to compensate for delay variations between the received sound signals, thereby obtaining velocity-dependent range-direction maps;
  deriving, from the velocity-dependent range-direction maps, velocity curves for respective objects based on their location;
  calculating, therefrom, a velocity curve for a respective object; and
  selecting, from the derived velocity curves, a maximum velocity as the velocity for the respective objects.

Velocity-dependent range-direction maps comprising information about the velocity, range and direction are obtained by beamform processing the velocity-dependent range maps to compensate for delay variations between the received sound signals. Velocity information is then extracted from the range-direction maps for respective Doppler-shifts based on the location of the reflecting object. In other words, herein a plurality of velocity curves for a respective reflecting object, one velocity curve for a respective emitted sound signal, are thus obtained. From there, a single velocity curve per object is derived by for example multiplying the velocity curves for a respective object together. Finally, a maximum velocity value is selected from thus derived single velocity curve as the velocity of the respective object.

By deriving a velocity curve for a respective object in this manner, the peakedness of the velocity curve around the correct velocity value increases. This rectifies any misplaced peaks in the velocity curves which may be caused by poor signal detection in the calculation of the velocity-dependent range maps. As a result, the overall accuracy of the velocity estimation is improved.

According to example embodiments, the deriving of the velocity curves for respective objects comprises selecting, for respective velocity-dependent range-direction maps, a maximum velocity for a respective Doppler-shift value within a selected area around the location of the respective objects.

In other words, velocity curves for the respective reflecting objects are constructed from each range-direction map by selecting, for respective Doppler shifts, the maximum velocity value within a region or a window around the location of the respective reflecting objects. By doing this, the number of local maxima in the derived velocity curve is limited and the peakedness of the global maxima in the curve is improved.

According to example embodiments, the processing unit further performs:
  identifying objects with a velocity peakedness below a predefined value, thereby identifying ghost objects; and
  discarding velocity and location of the identified ghost objects.

In other words, objects are identified as ghosts if the peakedness of their velocity curves is below a predefined value. The peakedness of the velocity curves may be obtained by for example calculating the variance or the kurtosis measure of the velocity curve or any other measure indicating the peakedness of a curve. These ghost objects may then be removed to derive an even more accurate representation of the environment.

According to an example embodiment, the at least two receivers are arranged in an irregular manner and the at least two emitters are arranged to form an emitter array and configured to respectively emit Pseudo-Random Additive White Gaussian Noise, PR-AWGN, signals.

The sound signals emitted by the emitters are Pseudo-Random Additive White Gaussian Noise, PR-AWGN, signals. A set of PR-AWGN signals may be thus used as the sound signals. The PR-AGWN signals are sensitive to Doppler-shifts and exhibit a steep roll-off with two small sidelobes. These characteristics determine the Doppler resolution of the system as defined by the Rayleigh criterion. This ensures a correct detection of the reflected signal at the sensor, even in harsh environments with deteriorated measurement conditions.

According to example embodiments, the respective sound signals comprise a Doppler-sensitive waveform.

By using sound signals sensitive to Doppler shifts, a higher resolution in terms of velocity is obtained. This increases the precision of the velocity estimation and hence further improves the discrimination between objects moving with similar speeds.

According to a second example aspect, a method is disclosed for determining location and velocity information of objects in an environment in an in-air sonar system comprising at least two emitters configured to emit respective sound signals into the environment, the respective sound signals having low cross-correlation amount each other, and at least two receivers configured to receive sound signals from the environment, the method comprising the steps of:
  obtaining, from the at least two receivers, respective sound signals comprising the respective emitted sound signals reflected from objects in the environment;
  calculating, from the respective received sound signals, velocity-dependent range maps for the respective emitted sound signals; the velocity-dependent range maps comprising information about the range and velocity of the respective objects;
  deriving, from the calculated velocity-dependent range maps and the spatial diversity of the at least two emitters and the at least two receivers, a velocity-dependent range-direction map comprising range information as a function of received direction;
  determining therefrom a location of the respective objects; and
  extracting, from the velocity-dependent range maps and the spatial diversity of the at least two receivers, a velocity of the respective objects based on the determined location.

According to an example embodiment, the extracting comprises:
  beamform processing, the velocity-dependent range maps to compensate for delay variations between the received sound signals, thereby obtaining a velocity-dependent range-direction map;
  deriving, from the respective velocity-dependent range-direction maps, velocity curves for respective objects based on their location;
  calculating, therefrom, a velocity curve for a respective object;
  selecting, from the obtained velocity curve, a maximum velocity as the velocity for the respective object;
  identifying objects with a velocity peakedness below a predefined value, thereby identifying ghost objects; and
  discarding velocity and location of the identified ghost objects.

The other example embodiments of the first example aspect may further be applied as example embodiments to the second example aspect.

According to a third example aspect, a computer program product is disclosed comprising computer-executable instructions for causing an in-air sonar system to perform the method according to the second example aspect.

According to a fourth example aspect, a computer readable storage medium is disclosed comprising computer-executable instructions for performing the method according to the second example aspect when the program is run on a computer.

The various example embodiments of the first and second example aspects may be applied as example embodiments to the third and fourth example aspects.

BRIEF DESCRIPTION OF THE DRAWINGS

Some example embodiments will now be described with reference to the accompanying drawings.

FIG. 1A shows a block scheme of an in-air sonar system according to a first exemplary embodiment of the present disclosure;

FIG. 1B shows the emitter array and the receiver array of the in-air sonar system of FIG. 1A in more detail;

FIG. 3B shows the calculated velocity-dependent range-direction map and the determined location of objects in the environment by the in-air sonar system of FIG. 3A;

FIG. 3C shows the calculated velocity-dependent range-direction map, the velocity curves for objects in the environment and the velocity of the respective objects by the in-air sonar system of FIG. 3A;

DETAILED DESCRIPTION OF EMBODIMENT(S)

Figure 1C:
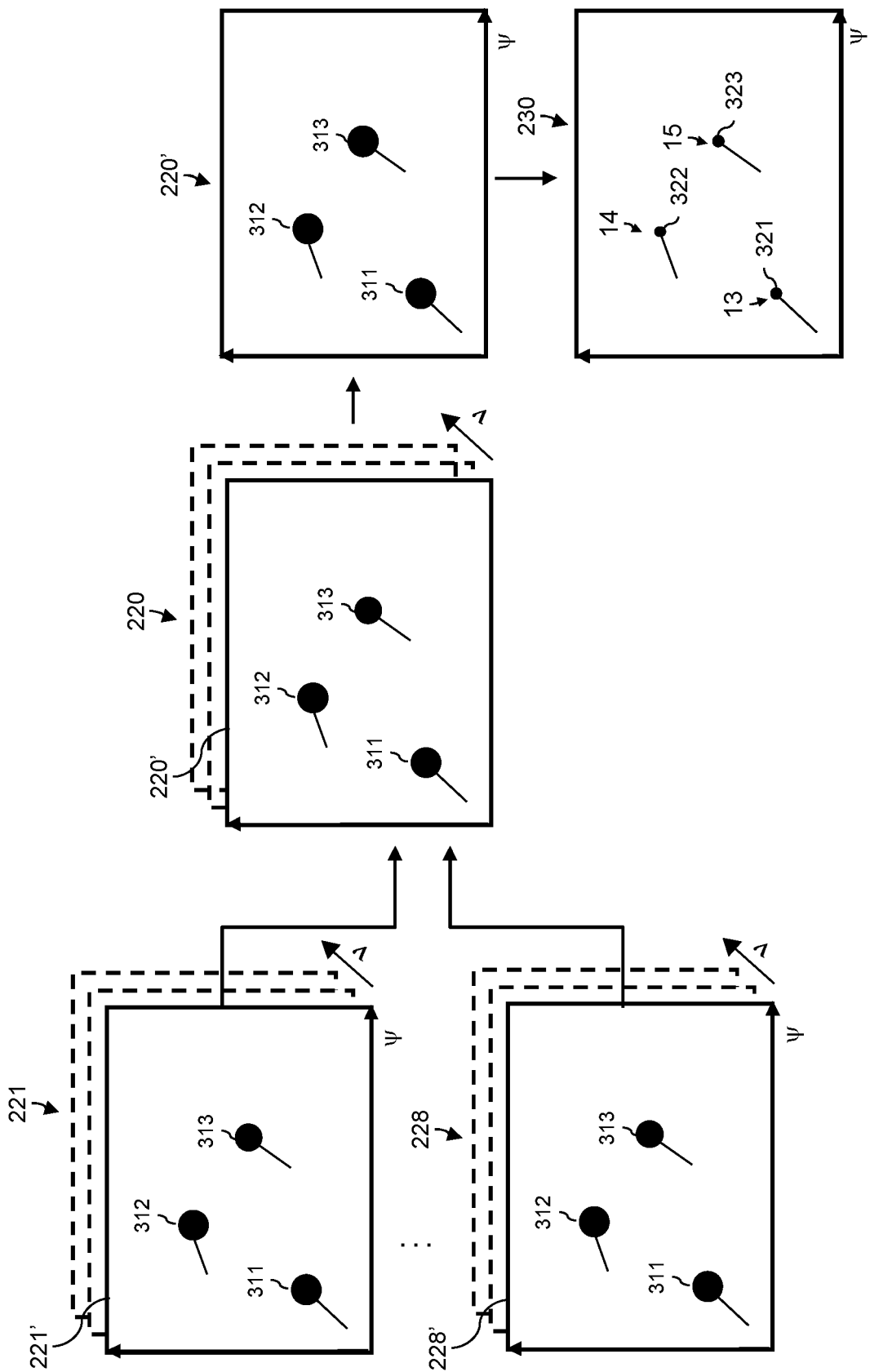
FIG. 1C shows the calculated velocity-dependent range-direction map and the determined location of the objects in the environment by the in-air sonar system of FIG. 1A.

FIG. 1A shows another example of the in-air sonar system 100 for detecting objects in the environment surrounding the sonar system 100. The system 100 comprises a sonar sensor 110 and a processing module 120. The sonar sensor comprises a plurality of N emitters forming an emitter array 111 and a plurality of M receivers forming a receiver array 112. Any other configurations of emitters and receivers are however possible. For example, the emitter array may comprise 8 emitters and the receiver array may comprise 8 receivers, thus realising a 64-element virtual antenna array. In this example, a 256-element virtual antenna array is realized with the emitter array comprising eight emitters and the receiver array comprising thirty-two receivers. In practice, the size of the virtual array is typically increased by adding more receivers rather than emitters as the receivers are cheaper and have a smaller footprint.

The emitters are placed irregularly within a boundary, e.g., a rectangular, circular or elliptical boundary, and the receivers are arranged in a pseudo-random configuration or irregular fashion within a boundary, e.g., an elliptical, circular or rectangular boundary, as shown in FIG. 1B and described in detail in the paper by R. Kerstens, et. al., "*An Optimized Planar MIMO Array Approach to In-Air Synthetic Aperture Sonar,*" IEEE Sensors Letters, vol. 3, no. 11, pp. 1-4, November 2019. In particular, the emitters are placed at positions $p_n^b=[x_n^b, y_n^b, z_n^b]^T$, n=1 ... N using a genetic algorithm designed to optimize the Point Spread Function, PSF, of the sonar sensor 110. Herein, index n is used to indicate a respective emitter and b to indicate the sound signal emitted by the emitters. The emitters emit respective sound signals 11 $s_n^b(t)$, n=1 ... N at the same time, for example for a period of 10 msec. The sound signals 11 are band-pass filtered Psuedo-Randon Additive White Gaussian Noise, PR-AWGN. The emitted sound signals 11 travel through the environment until they reach K reflecting objects located at positions $p_k^s=[x_k^s, y_k^s, z_k^s]^T$, k=1 ... K. When the signals reach the reflecting objects, the signals get reflected back towards the receivers. The reflected signals travel back through the environment until they reach back the receivers. The M receivers which are placed at positions $p_m^b=[x_m^b, y_m^b, z_m^b]^T$ thus record respective sound signals 12 $s_m^r(t)$, m=1 ... M. The sound signals 12 $s_m^r(t)$ received from the receivers are then fed to the processing unit 120 which processes them to determine the location and the velocity of the reflecting objects. This is done by first determining the location of the reflecting objects and then their velocity.

Figure 1D:
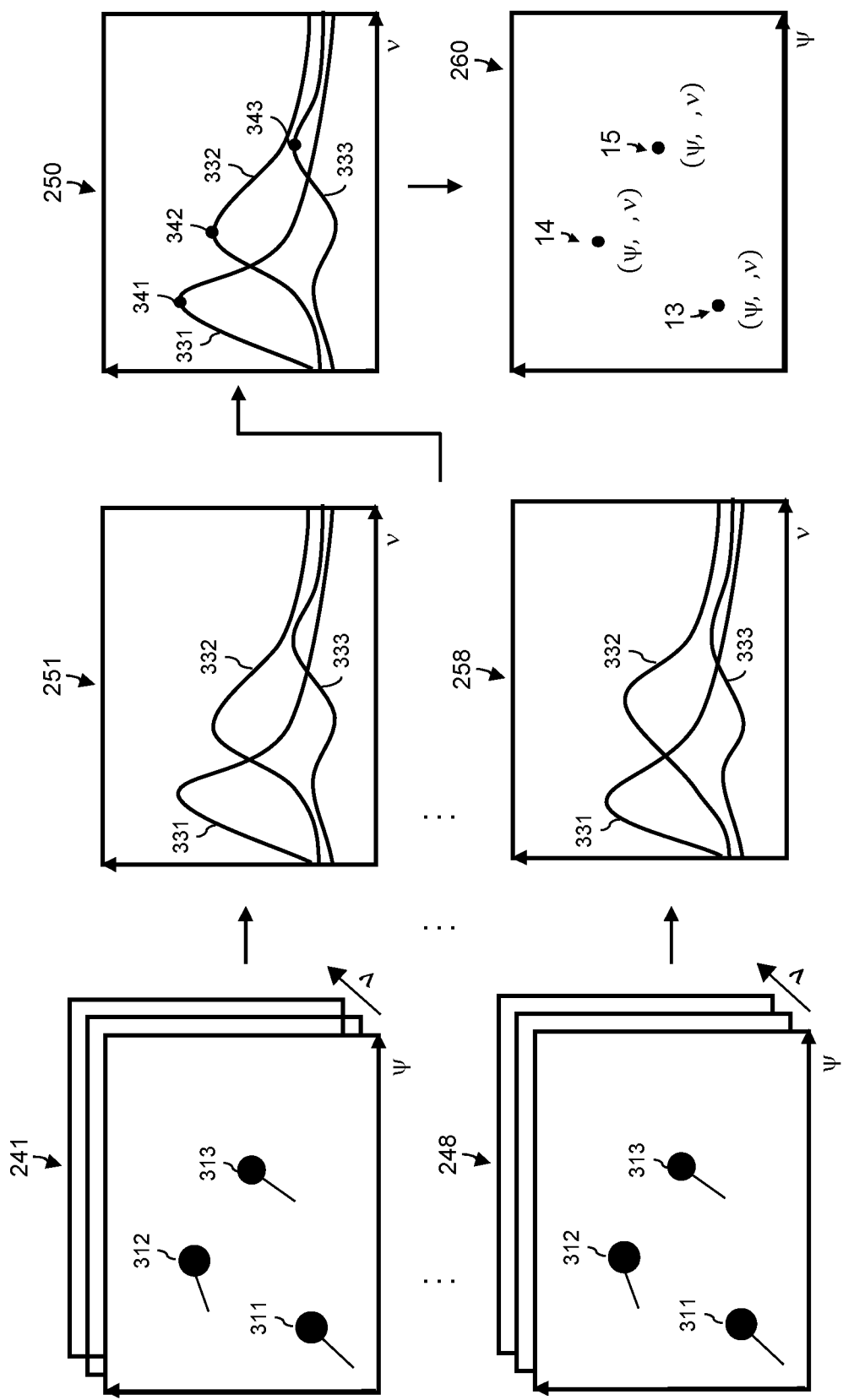
FIG. 1D shows the calculated velocity-dependent range-direction maps, the velocity curves for objects in the environment and the velocity of the respective objects by the in-air sonar system of FIG. 1A.
Figure 2C:
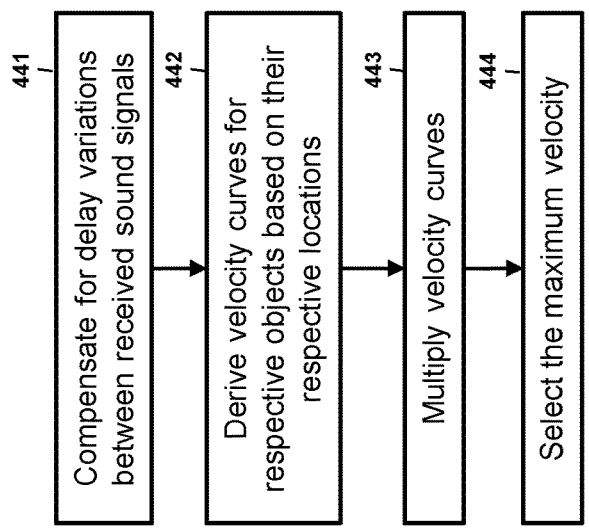
FIG. 2C shows steps for estimating the velocity of reflecting objects according to an example embodiment of the present disclosure.
Figure 2B:
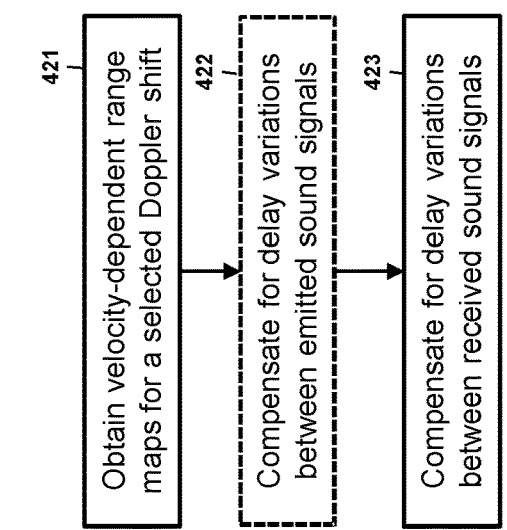
FIG. 2B shows steps for estimating the location of objects in the environment according to an example embodiment of the present disclosure.
Figure 2A:
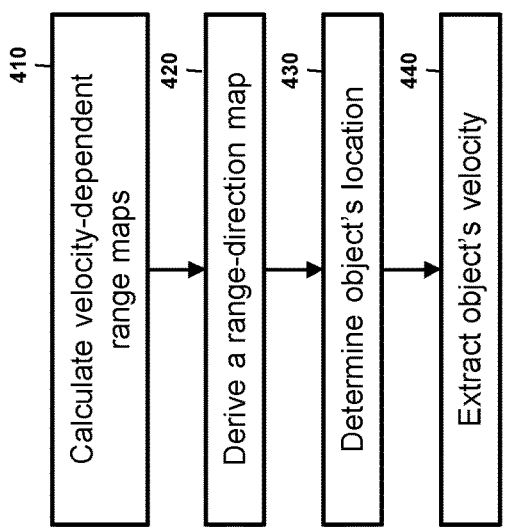
FIG. 2A shows an overview of the process steps for estimating the location and velocity information of objects in the environment according to an example embodiment of the present disclosure.
Figure 2D:
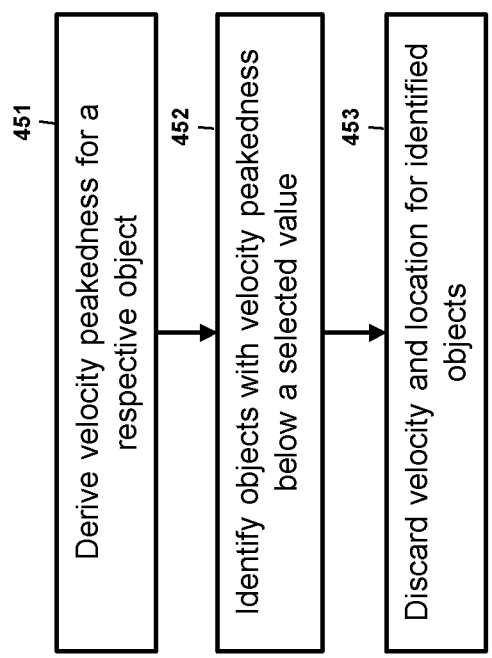
FIG. 2D shows steps for discarding ghost objects according to an example embodiment of the present disclosure.

The processing of the received sound signals will be now described in detail with reference to FIG. 1C, FIG. 1D and FIG. 2A to FIG. 2D, wherein FIG. 1C shows the velocity-dependent range-direction map and the determined location of the reflecting object, FIG. 1D shows the velocity-dependent range-direction map, the derived velocity curves and the velocity of the reflecting objects, FIG. 2A shows an overview of the process steps for estimating the location and velocity information of objects in the environment according to an example embodiment of the present disclosure, FIG. 2B shows steps for estimating the location of objects in the environment according to an example embodiment of the present disclosure, FIG. 2C shows steps for estimating the velocity of reflecting objects according to an example embodiment of the present disclosure, and FIG. 2D shows steps for discarding ghost objects according to an example embodiment of the present disclosure.

The sound signals as received by the respective receivers are a mixture of reflections caused by the reflecting objects reflecting the emitted sound signals. Mathematically, the sound signal received by a respective receiver m may be expressed as follows:

$$s_m^r(t) = \sum_{n=1}^{N} \sum_{k=1}^{K} \frac{1}{(r_{k,m}+r_{k,n})^2} s_n^b(t - \Delta t_{n,m,k}) \quad (1)$$

$$\Delta t_{n,m,k} = \frac{r_{k,n}+r_{k,m}}{v_s}, \quad (2)$$

where $r_{k,n}$ represents the range or the distance between the emitter n and the reflector k, $r_{k,m}$ represents the range or distance between the reflector k and the receiver m, and $\Delta t_{n,m,k}$ represents the time a respective sound signal $s_n^b$ travels from an emitter n to an object k and back from the object k to a receiver m. This time is typically referred to as the Round-Trip Time, RTT.

When a moving object causes the reflection, the emitted sound signal $s_n^b(t)$ is transformed by a so-called Doppler-effect. The Doppler effect causes a signal to scale in the time-domain depending on the movement of the object emitting the signal, i.e., the sonar system 100, and the object reflecting the signal, i.e., the reflecting objects 13, ..., 15. The frequency shift is frequency dependent and can be calculated as follows:

$$\Delta f = \frac{\Delta v}{c} f_0, \quad (3)$$

where $\Delta f$ represents the change in frequency between the incident and the reflected wave, $\alpha v$ the difference in radial velocity between the in-air sonar system and the reflecting object, c the propagation speed of sound and $f_0$ the frequency of the incident wave.

To detect the velocity of the objects, the in-air sonar system and more specifically the processing unit 120, looks for a set of radial velocities, e.g., $v_d=-1\ldots 0\ldots 1$ m/s. To achieve this, a set of Doppler-shifted sound signals are generated by frequency shifting the sound signal emitted by the respective emitters. The Doppler-shifted version $s_n^{b,d}(t)$ of an emitted sound signal $s_n^b(t)$ for a given radial velocity $v_d$ may be represented as $s_n^{b,d}(t)=D(s_n^b(t), v_d)$ with D indicating the Doppler operator. In this example, the Doppler-shifted versions of the sound signals 116 are computed in advance and stored in the pre-calculated signal bank 115.

Thus, in a first step 410, the processing unit 120 correlates the sound signals received by the respective receivers $s_m^r(t)$ with the Doppler-shifted versions of the respective emitted sound signals $s_n^{b,d}(t)$.

In practice, this may be performed by a filter module 130. The filter module 130 receives the received sound signals from the receivers 112 via its input 114 and the pre-calculated Doppler-shifted versions of the emitted sound signals via its other input 116. The filter module 130 comprises a set of N tuned matched filter banks, 131, . . . , 138, one filter bank for each emitted sound signal. Each matched filter bank comprises a number of filters, each being configured to correlate a respective received sound signal $s_1^r(t), \ldots, s_m^r(t)$ with a respective Doppler shifted version of the emitted sound signal. Mathematically, this may be expressed as follows:

$$s_m^{MF_n}(t)=F^{-1}[F(s_m^r(t))\cdot F(s_n^{b,d}(t))^*] \quad (4)$$

wherein $s_m^{MF_n}(t)$ is the output of the matched filter correlating the sound signal received by receiver m with the Doppler-shifted version of the sound signal emitted by emitter n.

As a result, M velocity-dependent range maps with a dimension of $N\times v_d$ comprising information about the range and velocity of the reflective objects are calculated. Having N×M matched filter outputs, a MIMO virtual array can be synthesized. For this purpose, beamform processing is required to compensate for differences in the time needed for a respective emitted sound signal to reach a specific object and to compensate for differences in the time needed for a sound signal reflected by the specific object to reach a respective receiver. In other words, beamform processing 422 is required to compensate for delay variations between the emitted sound signals and beamform processing 423 for delay variations between the received sound signals. Often, this is referred to as beamforming for the emitter array and beamforming for the receiver array.

In a second step 420, a velocity-dependent range-direction map 220 is calculated therefrom. For this, a conventional Delay-and-Sum beamforming 422 on the emitter array is applied by a first beamform processing module 140 followed by the same beamforming technique applied at the receiver array performed by a second beamform processing module 150. After the first beamform processing 422 M velocity-dependent range-direction maps 221, . . . , 228 will be obtained comprising range r and velocity information v as a function of the received direction $\psi$. This may be expressed mathematically as follows:

$$s_m^{BFE,\psi}(t)=\Sigma_{n=1}^N s_m^{MF_n}(t-\Delta t^{BFE}(\psi)) \quad (5)$$

where $\psi$ is the received or steering direction having a total of Z directions and yielding the direction dependent time difference between the emitters, $\Delta t^{BFE}$. Next in step 423, the same beamforming technique is applied but this time for the receiver array may be expressed as follows:

$$s_\psi^{BF,\psi}(t)\Sigma_{m=1}^{BFE,\psi}(t-\Delta t^{BF}(\psi)) \quad (6)$$

where the $\Delta t^{BF}$ is the direction dependent time different between the receivers and is the result of the sampling direction $\omega$ and the range r. Taking the envelope of $s_\psi^{BF,\psi}(t)$ results in $s_\psi^{EN,\psi}(t)$ which can be interpreted as a range-energy profile showing the amount of reflected energy for a given range r. Doing this for every sampling direction $\psi$ creates a velocity-specific or a Doppler-specific energy-scape, $DES^{v_d}$, for the sonar system for the currently selected value of $v_d$:

$$DES^{v_d}(\psi, t) = \begin{bmatrix} s_{\psi_1}^{EN,\psi}(t_0) & s_{\psi_2}^{EN,\psi}(t_0) & s_{\psi_z}^{EN,\psi}(t_0) \\ s_{\psi_1}^{EN,\psi}(t_1) & s_{\psi_2}^{EN,\psi}(t_1) & s_{\psi_z}^{EN,\psi}(t_1) \\ s_{\psi_1}^{EN,\psi}(t_r) & s_{\psi_2}^{EN,\psi}(t_r) & s_{\psi_z}^{EN,\psi}(t_r) \end{bmatrix}, \quad (7)$$

where r represents the number of range samples. Repeating this process for every radial velocity in $v_d$ will result in a velocity-dependent range-direction map 220 as shown in FIG. 1C.

In theory, a velocity-dependent range-direction map 220 is a collection of so-called velocity-specific energyscapes where a reflecting object is only imaged in the energyscape of which the velocity setting corresponds to the radial velocity at which the reflecting object is moving.

Due to the non-ideal response of the ambiguity function and noise collected throughout the system, in practice, this velocity-dependent range-direction map will be less clear as objects will not be located at a single direction-range value pair, leading to the observation of clouds of points centred around the location of a reflecting object. Furthermore, due to mismatch among the filters in the matched filter banks, variations in the shape of these clouds are observed among the velocity-dependent range-direction maps. This inaccuracy, but more importantly computational load required by the sonar system to calculate a high-resolution energyscape using the MIMO virtual array method for every radial velocity present in $v_d$, steers the research towards a less straightforward approach to make the system feasible.

In the next step 430, the location of the reflective objects is then determined. To do so, the velocity-dependent range-direction map 220 is clustered by the clustering module 160 to derive a map 230 with the location of the reflecting objects, i.e., to derive a single range-direction value pair, i.e., $(r,\psi)$, for a respective reflecting object. As shown in the figure, object 13 is located at a location 321, object 14 at location 322 and object 15 at location 323.

Agglomerative Hierarchical Clustering, AHC, technique may be applied. The AHC clusters an input data based on clustering or grouping set of rules until a stop condition, typically defined as a value, for the distinguished clusters is satisfied. The clustering algorithm combines closely positioned data points and remembers the distances between these points, i.e., leaves, or clusters, i.e., branches. Several different approaches are known in the art of implementing hierarchical clustering. These algorithms start with an association matrix, in this case, a matrix containing the distances between all points found, and will start linking the different elements in that matrix. The most popular and intuitive method is the Single-Link hierarchical clustering, SLINK, which determines the distance among the points in a data set and combine the two nearest. The approach leads to good results but is somewhat sensitive to noise or less suitable for handling off-shaped reflections.

Other hierarchical clustering methods using the average distances between pairs, i.e., Paired Group Methods, PGM, offer several advantages such as the ability to assign weights to points, and working with centroids instead of individual points. For the purpose of this application, the Unweighted Centroid Clustering, UPGMC, and Ward's method are preferred because of robustness to outliers. The UPGMC uses the group or cluster centroid point as the average point. Ward's method also utilizes the PGM approach but instead of defining distances based on the means between different points, Ward's method will try to minimize a more complex objective function.

The stop condition may be to stop clustering once all points that lie within a specific range are processed and no more branches can be combined without going beyond the specified distance-limit. This distance-limit may be the pairwise Euclidean distance between data points.

Preferably, the stop condition is defined as an inconsistency value where the variation of the different branch-lengths within a cluster is used. Once the variance of a specified number of sub-branches, e.g., two, three, or more sub-branches, exceeds a threshold value it is presumed that all the points of a certain cluster have been combined. This approach allows for more flexibility in the clustering process.

Alternatively, the clustering step may be performed based on a range-direction map for a specific velocity 220'. The range-direction map for a specific velocity may be obtained from the range-direction map 220 once the beamform processing is completed. For example, the information from the range-direction map for the first velocity 220' may be used by the clustering algorithm to derive the locations of the respective reflecting objects. Performing the clustering on a velocity-specific range-direction map 220' rather than on the complete velocity-dependent range-direction map 220 greatly lowers the complexity of the clustering algorithm and therefore the time needed to derive the location of the reflecting objects.

Another possibility is to derive a velocity-specific range-direction map 220' by performing the same beamform processing as detailed above, but on the range maps for a selected Doppler shift. To do so, velocity-specific range maps are fed to the beamformer 140 to obtain velocity-specific range-direction maps 220', ..., 228' which are then fed to the beamformer 150 to derive the velocity-specific range-direction map 220' as shown in FIG. 1C. Any Doppler shift may be selected for this purpose. This allows reducing the computation time and complexity of the beamform processing drastically.

The processing unit 120 then proceeds to step 440 to extract the velocity of the reflecting objects. Similarly to step 420, herein the velocity-dependent range maps 211, ..., 218 are beamform processed to compensate 441 for delay variation between the received sound signals only. Thus, M velocity-dependent range-direction maps 241, ..., 248, one velocity-dependent range-direction map for a respective received sound signal, are obtained comprising information about the velocity, range, and direction of the reflecting objects.

Similarly to step 430, due to the non-ideal response of the ambiguity function and noise collected throughout the system, clouds of points 312, ..., 313 centred around the location 321, ..., 323 of a reflecting object are observed in the respective velocity-specific range-direction maps 241, ..., 248. Moreover, due to mismatch among the filters in the matched filter banks, variations in the shape of the clouds among the respective velocity-specific range-direction maps are observed.

In other words, extracting velocity information based on the location of a reflecting object from one velocity-dependent range-direction map may be different from the velocity information extracted from other velocity-dependent range-direction maps. This is especially apparent when the location of a reflecting object, i.e., centroid point m, is derived from a velocity-specific range-dependent map. Extracting a velocity curve from the velocity-dependent range-direction maps based on a fixed point or a coordinate, i.e., $DES_{\dot{m}_\psi}^{v_d}$, with $v_d$ being a row vector containing the radial velocities will provide inaccurate estimations, as the true peak of the velocity curve might lie in a slightly offset position.

Employing the clustering algorithm of step 430 is however cumbersome as the large number of values in $v_d$ reduces the speed of the algorithm and increase its computational load.

Instead, as shown in plots 251, ..., 258, velocity curves 331, ..., 333 for the respective reflecting objects 13-15 are derived 442 by using a region or a window wi around the location $\dot{m}_\psi$ of the respective reflecting objects and taking the maximum velocity value for each window. Mathematically, this may be expressed as:

$$v_{\dot{m}} = \max(DES_{\dot{m}_{\psi+wi}}^{v_d}) \tag{8}$$

where $v_{\dot{m}}$ is a row vector representing the velocity curve derived based on the maximum velocity within the window wi. The size of the window is dependent on the accuracy of the overall system, although it should not be larger than a few data points to not hinder the resolution and estimation performance of the system.

N velocity curves 331, ..., 333 for each reflecting object are thus obtained. The extracted N velocity curves for the respective objects are then multiplied 443 by module 180 to obtain one velocity curve 331, ..., 333 for a respective object 13, ..., 15. Taking the product of the velocity curves of a respective reflecting object increases the peakedness of the resulting velocity curve in plot 250 at the correct value of $v_d$, along with the overall accuracy of the velocity estimations by rectifying any misplaced peaks caused by poor signal detection in the matched filter. For example, the individual velocity curves shown in plots 251, ... 258 may not exhibit strong peaks and some curves might peak at a different, incorrect $v_d$. By taking product the above issues are rectified thus leading to a correct velocity estimation.

The velocity curves 331, ..., 333 are then fed to module 190 which derives a velocity v of the respective reflecting object by selecting 444 the maximum velocity value 341, ..., 343 from the respective velocity curve 331, ..., 333 as the velocity of the object 13, ..., 15. The module 190 further groups the thus derived velocity v in 250 with the location r, ψ in 230 of the respective reflecting objects to produce consolidated information of the sensed objects in the environment.

As a result, the processing unit 120 derives information about the location r, ψ and velocity v for the respective reflecting objects 13, ..., 15 as shown by plot 260 in FIG. 1D.

According to further embodiments, the processing unit 120 is further configured to discard ghost objects. Ghost objects are a result of the presence of strong reflections. If an object reflects too much energy, its strong sidelobes are often detected in step 430 as reflecting objects, even if thresholding is applied before the clustering of the range-direction map, be it the complete velocity-dependent or velocity-specific range-direction map. These strong sidelobes thus lead to false-positive results. These false positives are not easy to omit, as they require complex thresholding along with the risk of omitting an actual closely positioned reflecting objects.

It was observed that because of the unpredictable frequency content of these sidelobes, the velocity curves derived in step 442 exhibit a maximum value at a random velocity $v_d$. As a result, after the step of multiplication 443, the resulting sidelobe's velocity curve 250 does not produce a decent peak, i.e., the velocity curve exhibits a significantly smaller or weak peakedness than that of real objects.

Thus, a technique exploiting this observation has been employed to discard ghost objects. As shown in FIG. 2D, in a first step 451, the peakedness of the velocity curve of a respective object is derived. For example, the peakedness of the velocity curve 250 may be obtained by calculating the variance of the velocity curve, i.e., $var(v_m)$. Alternatively, the kurtosis measure of the velocity curve or any other measure that indicates the peakedness of a curve may be calculated instead.

In the next step 452, ghost objects are identified by thresholding the variance of the velocity curves 250. The processing unit 120 then filters out or discards 453 these ghost objects by simply removing the location and velocity information associated with these objects. As a result, a more stable and trustworthy knowledge of the environment is obtained.

Figure 3A:
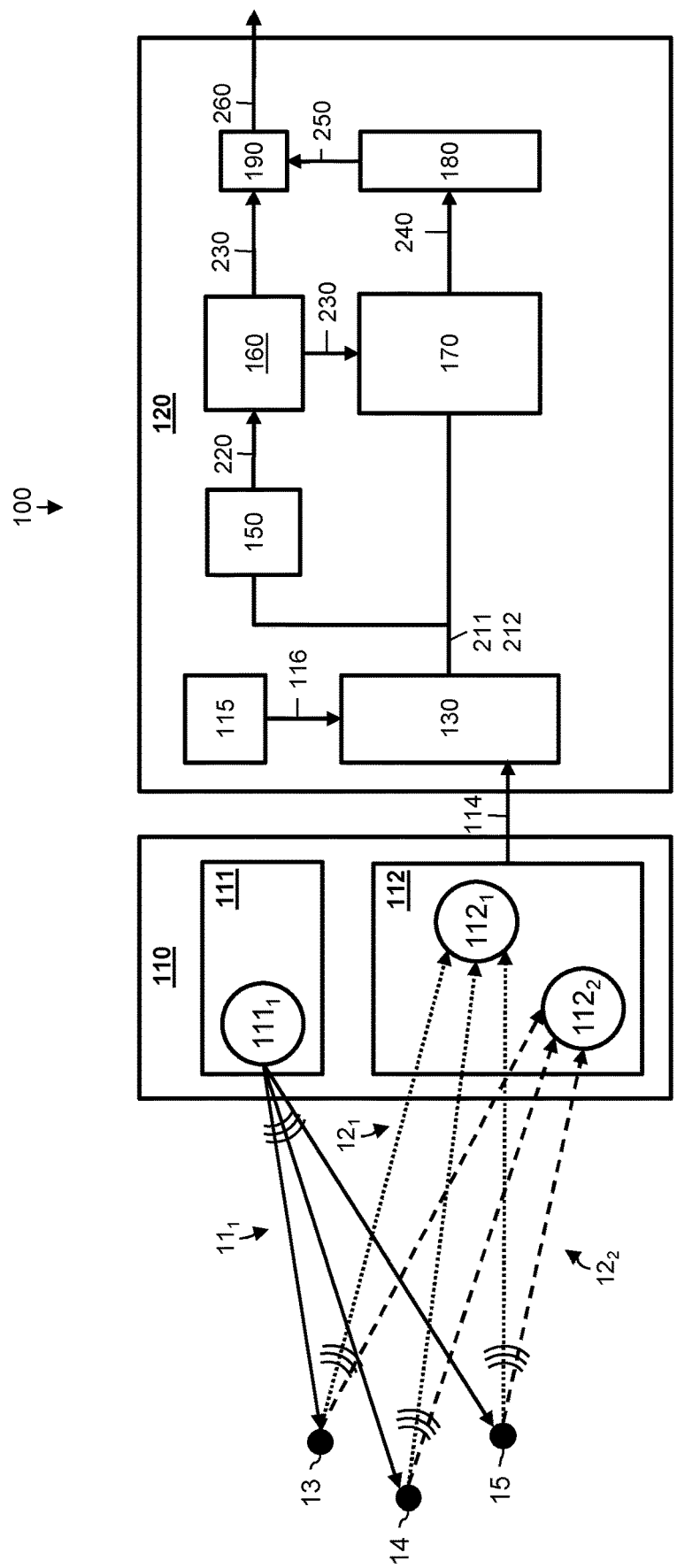
FIG. 3A shows a block scheme of an in-air sonar system according to a second exemplary embodiment of the present disclosure.

The simplest configuration of the in-air sonar system comprises an emitter array with one emitter and a receiver array with two receivers as shown in FIG. 3A. The processing of the received sound signals will be described with reference to FIG. 3B showing the velocity-dependent range-direction map and the determined location of the reflecting objects, FIG. 3C showing the velocity-dependent range-direction map and the determined velocity for the reflecting objects, as well as the various steps performed by the processing unit 120 method to derive the location and the velocity of the reflecting objects as shown in FIG. 2A to FIG. 2C.

In this implementation the location r, ψ and velocity v for the respective reflecting objects 13, . . . , 15 are obtained in the same manner as described above with reference to FIG. 1A with the difference that the processing herein is much simpler due to the simpler in-air sonar system implementation.

Herein, one sound signal $11_1$ is emitted by the emitter $111_1$. The sound signal is a PR-AWGN signal. The sound signal is reflected by the reflecting objects 13-15 back to the two receivers $112_1$ and $112_2$. The sound signals $12_1$ and $12_2$ received by the two receivers are then fed to the processing unit 120 to determine the location and the velocity of the reflecting objects.

In a first step 410, the received signals are correlated with the Doppler-shifted versions of the emitted sound signal 116 which are computed in advance and stored in the pre-calculated signal bank 115. Similarly to above, this step may be performed by a filter module 130 comprising a set of tuned matched filters which correlate the received sound signal with the respective Doppler-shifted version of the sound signal. As a result, two velocity-dependent range maps 211 and 212 with dimension of $N \times v_d$, one for each receiver, are obtained.

In a second step 420, a velocity-dependent range-direction map 220 is calculated therefrom. Differently from the implementation of FIG. 1A, herein the beamforming processing module 150 applies a conventional Delay-and-Sum beamforming 423 for the receiver array only. The beamform processing for the emitter array, i.e., step 422 of FIG. 2B, is obsolete as there is only one emitter in this implementation.

In a next step 430, the velocity-dependent range-direction map 220 is clustered by the clustering module 160 to derive a location map 230 comprising the locations 321-323 of the respective reflecting objects 13-15, i.e., to derive a single range-direction value pair r, ψ, as detailed above with reference to FIG. 1A. Similarly to the implementation of FIG. 1A, the clustering may be performed on the complete velocity-dependent range-direction map 220 or on a Doppler-specific range-direction map 220' as shown in FIG. 3B. For example, the information from the range-direction map for the first or any other velocity may be used. Alternatively, a velocity-specific or Doppler specific range-direction map 220' may be obtained by performing the same beamform processing on the velocity-specific range maps instead.

The method proceeds to step 440, to extract the velocity of the reflecting objects. To do so, the module 170 first beamform processes 441 the velocity-dependent range maps 211 and 212 thereby deriving a velocity-dependent range-direction map 240. Note that in this implementation, the beamform processing performed by module 170 is exactly the same as the beamform processing performed by module 150. For example, module 170 may perform the beamform processing and feed the derived velocity-dependent range-direction map to the clustering module 160. Alternatively, module 150 may perform the beamform processing and feed the derived velocity-dependent range-direction map to module 170 for further processing. Next, the module 170 derives 442 therefrom velocity curves 321-323 for the respective reflecting objects 13-15 based on the information in the location map 230 derived from module 160. The derivation step 442 is performed in the same manner as described above with reference to FIG. 1A, i.e., velocity curves 331-333 are obtained by taking, from the respective Doppler-specific range-direction maps, the maximum velocity value within a window around the location 321-323 of the respective reflecting objects 13-15. As a result, a map 250 with velocity curves 331-333 for the respective reflecting objects 13-15 is obtained.

Next, the module 190 selects 444 a velocity v for the respective reflecting objects by taking the maximum velocity value 341-343 from the velocity curve 331-333 as the velocity value for the respective objects 13-15 and finally groups velocity information 250 with the location information 230 to produce consolidated information 260 of the sensed objects 13-15 in the environment.

Similarly to above, ghost objects may be discarded by identifying objects with velocity peakedness below a selected value as described above with reference to FIG. 2D. Again, the peakedness may be derived by calculating the variance, the kurtosis measure or another measure indicating the peakedness of the respective velocity curves.

Figure 4:
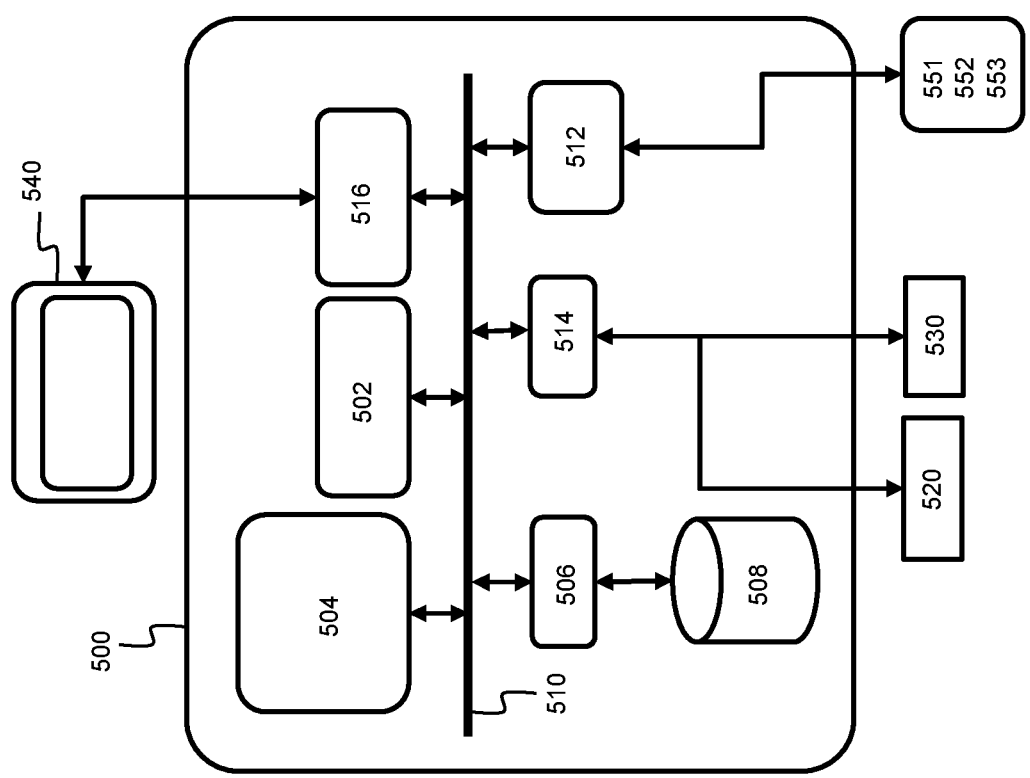
FIG. 4 shows an example embodiment of a suitable computing system for performing one or several steps in embodiments of the present disclosure.

FIG. 4 shows a suitable computing system 500 enabling to implement embodiments of the method for estimating range and velocity information of reflecting objects by an in-air sonar system according to the present disclosure. Computing system 500 may, in general, be formed as a suitable general-purpose computer and comprise a bus 510, a processor 502, a local memory 504, one or more optional input interfaces 514, one or more optional output interfaces 516, a communication interface 512, a storage element interface 506, and one or more storage elements 508. Bus 510 may comprise one or more conductors that permit communication among the components of the computing system 500. Processor 502 may include any type of conventional processor or microprocessor that interprets and executes programming instructions. Local memory 504 may include a random-access memory, RAM, or another type of dynamic storage device that stores information and instructions for execution by processor 502 and/or read-only memory, ROM, or another type of static storage device that stores static information and instructions for use by processor 502. Input interface 514 may comprise one or more conventional mechanisms that permit an operator or user to input information to the computing device 500, such as a keyboard 520, a mouse 530, a pen, voice recognition and/or biometric mechanisms, a camera, etc. Output interface 516 may comprise one or more conventional mechanisms that output information to the operator or user, such as a display 540, etc. Communication interface 512 may comprise any transceiver-like mechanism such as for example one or more Ethernet interfaces that enables computing system 500 to communicate with other devices and/or systems, for example with other computing devices 551, 552, 553. The communication interface 512 of computing system 500 may be connected to such another computing system by means of a local area network, LAN, or a wide area network, WAN, such as for example the internet. Storage element interface 506 may comprise a storage interface such as for example a Serial Advanced Technology Attachment, SATA, interface or a Small Computer System Interface, SCSI, for connecting bus 510 to one or more storage elements 508, such as one or more local disks, for example SATA disk drives, and control the reading and writing of data to and/or from these storage elements 508. Although the storage element(s) 508 above is/are described as a local disk, in general any other suitable computer-readable media such as a removable magnetic disk, optical storage media such as a CD or DVD, -ROM disk, solid state drives, flash memory cards, . . . could be used. Computing system 500 could thus correspond to the processing circuitry in the embodiments illustrated by FIG. 1A and FIG. 3A.

As used in this application, the term "circuitry" may refer to one or more or all of the following:
  (a) hardware-only circuit implementations such as implementations in only analog and/or digital circuitry and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions and
  (c) hardware circuit(s) and/or processor(s), such as microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An in-air sonar system for determining location and velocity information of objects in an environment, the in-air sonar system comprising at least two emitters configured to emit respective sound signals into the environment, the respective sound signals having a low cross-correlation among each other; at least two receivers configured to receive sound signals from the environment; and a processing unit configured to perform:
  obtaining, from the at least two receivers, respective received sound signals comprising the respective emitted sound signals reflected from objects in the environment;
  calculating, from the respective received sound signals, velocity-dependent range maps for the respective emitted sound signals; the velocity-dependent range maps comprising information about the range and velocity of the respective objects;
  deriving, from the calculated velocity-dependent range maps and the spatial diversity of the at least two emitters and the at least two receivers, a velocity-dependent range-direction map comprising range information as a function of a received direction;
  determining therefrom a location of the respective objects; and
  extracting, from the velocity-dependent range maps and the spatial diversity of the at least two receivers, a velocity of the respective objects based on the determined location.

2. The in-air sonar system according to claim 1, wherein the calculating comprises correlating the respective received sound signals with Doppler-shifted versions of the emitted sound signals.

3. The in-air sonar system according to claim 1, wherein the deriving comprises:
beamform processing the velocity-dependent range maps to compensate for delay variations between the emitted sound signals and between the received sound signals, thereby obtaining the velocity-dependent range-direction map.

4. The in-air sonar system according to claim 3, wherein the determining comprises:
clustering the velocity-dependent range-direction map by means of a clustering algorithm thereby obtaining the location of the respective objects.

5. The in-air sonar system according to claim 4, wherein the clustering algorithm is an Agglomerative Hierarchical Clustering, AHC, algorithm.

6. The in-air sonar system according to claim 1, wherein the extracting comprises:
beamform processing the velocity-dependent range maps to compensate for delay variations between the received sound signals, thereby obtaining velocity-dependent range-direction maps;
deriving, from the respective velocity-dependent range-direction maps, velocity curves for respective objects based on their location;
calculating, therefrom, a velocity curve for a respective object; and
selecting, from the obtained velocity curve for a respective object, a maximum velocity as the velocity for the respective object.

7. The in-air sonar system according to claim 6, wherein the deriving comprises selecting, for respective velocity-dependent range-direction maps, a maximum velocity for a respective Doppler-shift value within a selected area around the location of the respective objects.

8. The in-air sonar system according to claim 6, wherein the processing unit further perform:
identifying objects with a velocity peakedness below a predefined value, thereby identifying ghost objects; and
discarding velocity and location of the identified ghost objects.

9. The in-air sonar system according to claim 1, wherein the at least two receivers are arranged in an irregular manner and wherein the at least two emitters are arranged to form an emitter array and configured to respectively emit Pseudo-Random Additive Gaussian Noise, PR-AWGN, signals.

10. The in-air sonar system according to claim 1, wherein the respective sound signals comprise a Doppler-sensitive waveform.

11. A method for determining location and velocity information of objects in an environment in an in-air sonar system comprising at least two emitters configured to emit respective sound signals into the environment, the respective sound signals having a low cross-correlation among each other, and at least two receivers configured to receive sound signals from the environment, the method comprising the steps of:
obtaining, from the at least two receivers, respective sound signals comprising the respective emitted sound signals reflected from objects in the environment;
calculating, from the respective received sound signals, velocity-dependent range maps for the respective emitted sound signals; the velocity-dependent range maps comprising information about the range and velocity of the respective objects;
deriving, from the calculated velocity-dependent range maps and the spatial diversity of the at least two emitters and the at least two receivers, a velocity-dependent range-direction map comprising range information as a function of received direction;
determining therefrom a location of the respective objects; and
extracting, from the velocity-dependent range maps and the spatial diversity of the at least two receivers, a velocity of the respective objects based on the determined location.

12. The method according to claim 11, wherein the extracting comprises:
beamform processing the velocity-dependent range maps to compensate for delay variations between the received sound signals, thereby obtaining a velocity-dependent range-direction map;
deriving, from the respective velocity-dependent range-direction maps, velocity curves for respective objects based on their location;
calculating, therefrom, a velocity curve for a respective object; and
selecting, from the obtained velocity curve for a respective object, a maximum velocity as the velocity for the respective object;
identifying objects with a velocity peakedness below a predefined value, thereby identifying ghost objects; and
discarding velocity and location of the identified ghost objects.

13. A computer program product comprising computer-executable instructions for causing an in-air sonar system to perform the method according to claim 11.

14. A computer readable storage medium comprising computer-executable instructions for performing the method according to claim 11 when the program is run on a computer.

* * * * *